(12) United States Patent
Meng et al.

(10) Patent No.: US 10,308,140 B2
(45) Date of Patent: Jun. 4, 2019

(54) RENEWABLE ENERGY-BASED HYBRID BI-DIRECTIONALLY INTERACTIVE DC TRACTION POWER SUPPLY SYSTEM

(71) Applicants: STATE GRID CORPORATION OF CHINA, Beijing (CN); NORTH CHINA ELECTRIC POWER UNIVERSITY (BAODING), Baoding (CN); STATE GRID LIAONING ELECTRIC POWER COMPANY LIMITED ECONOMIC RESEARCH INSTITUTE, Shenyang (CN)

(72) Inventors: Ming Meng, Baoding (CN); Jian Liu, Shenyang (CN); Xiping Wang, Baoding (CN); Dalong Hu, Shenyang (CN); Li Jiang, Shenyang (CN); Yingwei Song, Shenyang (CN); Yan Liu, Shenyang (CN); Liaoyi Ning, Shenyang (CN)

(73) Assignees: State Grid Corporation of China, Beijing (CN); North China Electric Power University, Baoding (CN); State Grid Liaoning Electric Power Company Limited Economic Research Institute, Shenyang (CN)

( * ) Notice: Subject to any disclaimer, the term of this patent is extended or adjusted under 35 U.S.C. 154(b) by 0 days.

(21) Appl. No.: 14/907,808

(22) PCT Filed: Jul. 26, 2014

(86) PCT No.: PCT/CN2014/083092
§ 371 (c)(1),
(2) Date: Jan. 26, 2016

(87) PCT Pub. No.: WO2015/014249
PCT Pub. Date: Feb. 5, 2015

(65) Prior Publication Data
US 2016/0159250 A1  Jun. 9, 2016

(30) Foreign Application Priority Data

Jul. 29, 2013 (CN) .......................... 2013 1 0325905

(51) Int. Cl.
*B60M 3/06* (2006.01)
*B60M 1/30* (2006.01)

(52) U.S. Cl.
CPC .............. *B60M 3/06* (2013.01); *B60M 1/307* (2013.01)

(58) Field of Classification Search
CPC . B60M 1/00; B60M 1/12; B60M 1/13; B60M 3/00; B60M 3/02; B60M 3/04; B60M 3/06; B60M 5/00; B60M 5/02
See application file for complete search history.

(56) References Cited

U.S. PATENT DOCUMENTS 8,146,513 B2 * 4/2012 Ibaiondo Madariaga ...................
B60M 3/06
104/289
2011/0144831 A1 * 6/2011 Hata ........................ B60M 3/06
701/2

FOREIGN PATENT DOCUMENTS

CN  201220609 Y  4/2009
CN  102267405 A  12/2011
(Continued)

*Primary Examiner* — Robert J McCarry, Jr.
(74) *Attorney, Agent, or Firm* — George G. Wang; Bei & Ocean (57) ABSTRACT

A renewable energy-based hybrid bi-directionally interactive DC traction power supply system includes two traction substations. Each substation includes transformers, rectifiers, bidirectional AC-DC converters, a DC bus, a catenary, a steel rail and a section post. A DC bus between two adjacent traction substations is provided with a DC renewable energy system constructed by an electric vehicle charging-discharging system, a distributed generation and more (Continued)

than one low voltage DC microgrid. The DC renewable energy system is connected to the DC bus between two adjacent traction substations through a high voltage DC bus, thus a DC circular microgrid being formed in a power supply section post. The electric vehicle charging-discharging system is formed by more than one bidirectional DC-DC charging-discharging equipments which are intended for in connection with the power batteries of the electric vehicle. The renewable energy-based hybrid bi-directionally interactive DC traction power supply system of the invention realizes effective usage of distributed generation and recycling of electric locomotive braking energy, reducing DC voltage fluctuation, thus improving reliability of the DC traction power supply system.

6 Claims, 5 Drawing Sheets

(56) References Cited

FOREIGN PATENT DOCUMENTS

| | | |
|---|---|---|
| CN | 102290841 A | 12/2011 |
| CN | 102306931 A | 1/2012 |
| CN | 102394557 A | 3/2012 |
| CN | 202353235 U | 7/2012 |
| CN | 103434421 A | 12/2013 |
| CN | 103448573 A | 12/2013 |
| CN | 203358380 U | 12/2013 |
| CN | 203358382 U | 12/2013 |
| EP | 2093095 A1 | 8/2009 |
| JP | 55-132331 A | 10/1980 |
| JP | 2011126370 A | 6/2011 |
| RU | 94918 U1 | 6/2010 |
| WO | WO00/12342 A1 | 3/2000 |

* cited by examiner

RENEWABLE ENERGY-BASED HYBRID BI-DIRECTIONALLY INTERACTIVE DC TRACTION POWER SUPPLY SYSTEM

CROSS-REFERENCE TO RELATED APPLICATIONS

This application claims priority from CN Application No. CN201310325905.1, filed Jul. 29, 2013 and PCT Application No. PCT/CN2014/083092, filed Jul. 26, 2014, the contents of which are incorporated herein in the entirety by reference.

FIELD OF THE INVENTION

The present invention relates to a DC traction power supply system and more particularly, relates to a renewable energy-based hybrid bi-directionally interactive DC traction power supply system, which incorporates distributed generation, charging and discharging system of electric vehicle mainly employing battery-swapping, and DC traction power supply system.

BACKGROUND OF THE INVENTION

With rapid development of economy and urbanization, energy crisis, environment pollution, and traffic congestion are becoming more and more serious in the worldwide. City electric transportation vehicles (such as metro, tram, and trolley bus) and electric vehicles may relieve increasingly serious urban traffic congestion problem, reduce consumption of limited fossil fuel, reduce air pollution, realize energy-saving and emission-reducing and sustainable development of city, thus becoming a major vehicle to be developed in future city.

Development of electric vehicle industry requires corresponding charging system. There are normally three kinds of charging modes: normal charging, rapid charging, and power batteries rapid swapping system (briefly referred as to battery-swapping). Whereas battery-swapping is a better charging mode for urban public transportation vehicles. Electric vehicle charging system needs not only huge construction cost, but also will have bad effects on power system. Furthermore, power batteries of electric vehicle are also an energy storage equipment of huge capacity.

A conventional DC traction power supply system generally utilizes diode rectifiers to realize power supplying. There are two kinds of manners by which a traction substation provides power to a catenary: unilateral power supply and bilateral power supply. And DC power supply voltage ratings as set forth in China Standard are 750V and 1500V. Braking energy of an electric locomotive often is lost in braking resistors. This not only causes energy consumption, but also causes rising of temperature in tunnel, thereby burdening temperature control system and causing further energy consumption. Recycling of electric locomotive braking energy is an object to be realized in future in traction power supply system.

Figure 1:
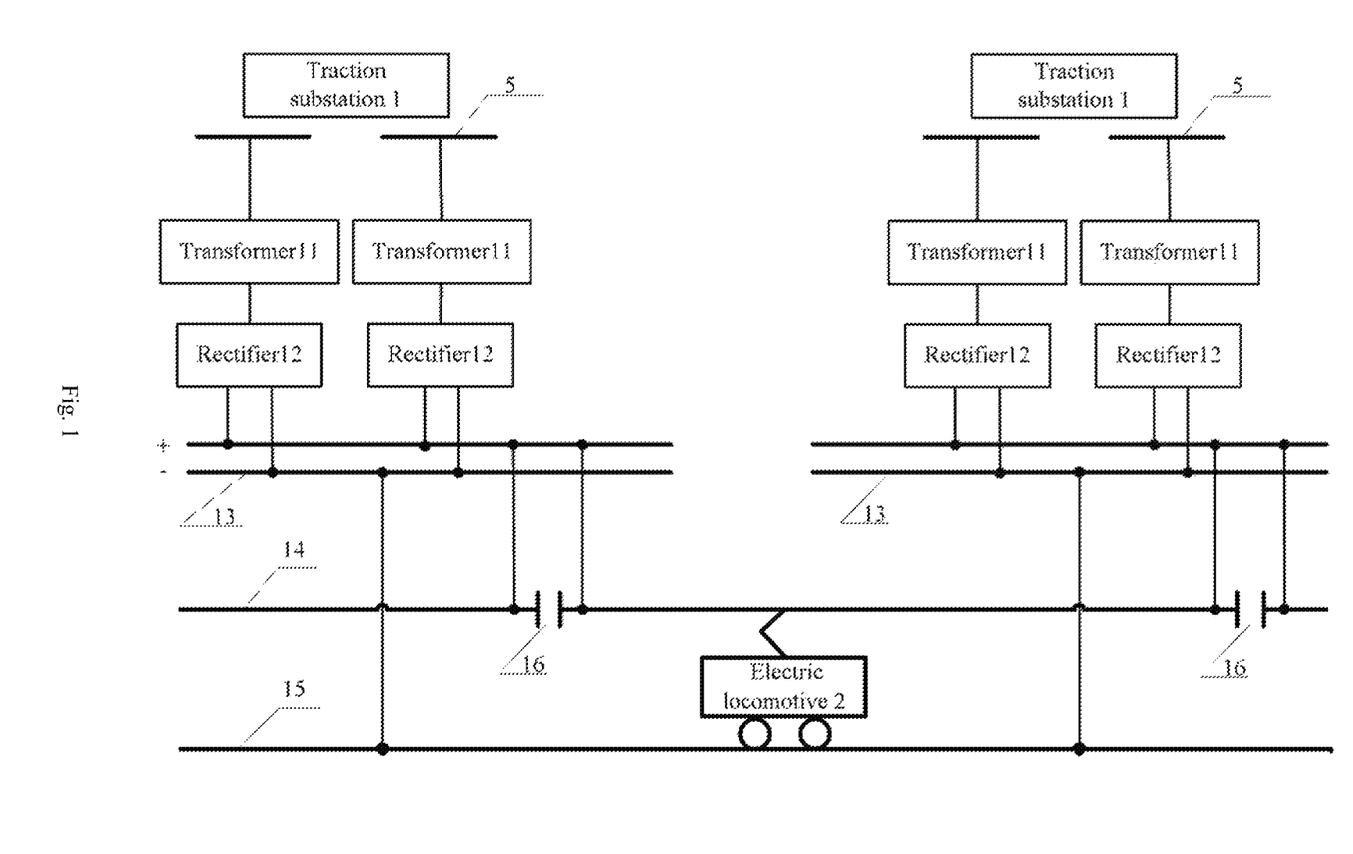
FIG. 1 shows a schematic view of a conventional DC traction power supply system.

As shown in FIG. 1, a prior art DC traction power supply system includes one or more traction substations 1 for offering DC energy to an electric locomotive 2. The traction substation 1 runs based on a conventional diode rectification DC traction power supply system. Each traction substation 1 is composed of a plurality of transformers 11, a plurality of rectifiers 12, a DC bus 13, a catenary 14, a steel rail 15 and a section post 16. Wherein, each transformer 11 may be a two-winding transformer, three-winding transformer, or another kind of three-winding transformer of which the primary winding is connected in a prolonged delta manner and phase shift is ±7.5°. Each rectifier 12 may be of a six-pulse, twelve-pulse or twenty four-pulse rectifier.

For a conventional DC traction power supply system, during operation valley and nonoperation period of the electric locomotive, the main substation at AC end has low power factor and therefore requires reactive power compensation measurement.

Fast progress of economy promotes quick growth of electric power demand. Conventional centralized large centralized power grid suffers from high cost, great difficulty in operation, and is hard to meet higher and higher safety and reliability requirement of the user. Compared to centralized power generation, a distributed system has the advantages of less pollution, high energy usage, and is flexible to be mounted in suitable site. As such, it reduces operation cost and resources of transmission and distribution, reduces line loss of centralized power supplying, reduces total capacity of the grid, improves grid peak and valley performance and reliability and accordingly, it is strong assistance and effective support for large centralized power grid, and represents one of development trends of the power system.

The distributed generation includes solar photovoltaic cell, a wind turbine generator, a micro gas turbine, a fuel cell, and biomass power generation and the like.

A single distributed generation has high access cost, and difficulty in control. Compared to a large centralized power grid, it is uncontrolled power source and as a result, this distributed generation is often handled by the large centralized power grid by means such as limitation and isolation with the purposes of decreasing its impact on the large centralized power grid, hence significantly restricting usage of distributed generation.

Sufficiently exploiting urban electric public transportation, distributed generation such as solar photovoltaic cell, micro gas turbine and fuel cell may be realized.

A microgrid is an organic system constructed collectively of load, micro sources (such as distributed generation in the microgrid, for example photovoltaic generation, wind generation or the like), energy storage devices and electric power transformation devices. For power supply inside the microgrid, power electronic devices mostly perform energy transformation, and provide necessary control. The microgrid is able to effectively overcome problems of access the above distributed generation to the large centralized power grid, and coordinate conflict between the large centralized power grid and distributed generation.

A microgrid may be classified into AC microgrid, DC microgrid, high frequency microgrid and AC/DC hybrid microgrid. As the solar photovoltaic cell and fuel cell of the distributed generation are of DC type, while the wind turbine generator, micro gas turbine and biomass power generation are of AC with different frequency which can be converted into DC current through one time rectification. DC microgrid has no skin effect, lower loss, higher efficiency, and has no need for reactive power compensation. It has no stability problem existing in AC power supply system, and its transmission distance and power is not restricted by power system inherent operation stability, and it is easy to control. Therefore, it has extensive development and application prospect.

SUMMARY OF THE INVENTION

The technical problem to be solved by the present invention is to provide a renewable energy-based hybrid bi-directionally interactive DC traction power supply system for realizing effective usage of distributed generation and recycling of electric locomotive braking energy, reducing DC voltage fluctuation of a conventional DC traction power supply system, improving power factor at AC end of the main substation of the DC traction power supply system, reducing harmonic waves, improving reliability of the DC traction power supply system, and reducing construction cost of the electric vehicle charging system.

The solution of the current invention is described below. A renewable energy-based hybrid bi-directionally interactive DC traction power supply system includes at least two traction substations for supplying DC energy to an electric locomotive, wherein each traction substation has more than one first transformer connected to a AC bus and more than one second transformer connected to the AC bus; the other end of each first transformer is correspondingly coupled to a rectifier, and the other end of each second transformer is correspondingly coupled to a bidirectional AC-DC converter; the other end of each rectifier and bidirectional AC-DC converter is coupled to a DC bus of a corresponding traction substation; the positive and negative ends of the DC bus are connected to a catenary and steel rail respectively; the positive and negative ends of the electric locomotive are connected to the catenary and steel rail respectively; the catenary of each traction substation is coupled with a section post; the both ends of the section post are connected to positive end of a corresponding DC bus; a DC bus between two adjacent traction substations is provided with a DC renewable energy system constructed by an electric vehicle charging-discharging system, a distributed generation and more than one low voltage DC microgrid; the DC renewable energy system is connected to the DC bus between two adjacent traction substations through a high voltage DC bus, thus a DC circular microgrid being formed in a power supply section post, and wherein the electric vehicle charging-discharging system is formed by more than one bidirectional DC-DC charging-discharging equipments which are intended for in connection with the power batteries of the electric vehicle.

An output end, for connecting to the power batteries of the electric vehicle, of each DC-DC charging-discharging equipments is connected in parallel to a super capacitor.

The distributed generation includes more than one micro gas turbine, more than one wind turbine generator, more than one fuel cell, and more than one solar photovoltaic cell; each of the micro gas turbine and wind turbine generator is connected respectively to the high voltage DC bus by a unidirectional AC-DC converter; and each of the fuel cell and solar photovoltaic cell is connected respectively to the high voltage DC bus by a unidirectional DC-DC converter.

The low voltage DC microgrid comprise a circular low voltage DC bus which is connected to the high voltage DC bus via a bidirectional DC-DC converter, more than one energy storage device, more than one micro gas turbine, more than one solar photovoltaic cell, more than one fuel cell, more than one wind turbine generator, more than one unidirectional DC-AC converter, more than one bidirectional DC-DC charging-discharging equipment, and more than one unidirectional DC-DC converter; each of the solar photovoltaic cell and fuel cell is connected respectively to the circular low voltage DC bus by a unidirectional DC-DC converter; each of the micro gas turbine and wind turbine generator is connected respectively to the circular low voltage DC bus a by a unidirectional AC-DC converter; each energy storage device is connected to the circular low voltage DC bus through a bidirectional DC-DC converter; an output end of each unidirectional DC-AC converter is connected to an AC load; the other end of each bidirectional DC-DC charging-discharging equipment is connected to the battery of the electric vehicle; and an output end of each unidirectional DC-DC converter is connected to a DC load.

The low voltage DC microgrid comprises a radial low voltage DC bus connected to the high voltage DC bus via a bidirectional DC-DC converter, more than one energy storage device, more than one micro gas turbine, more than one solar photovoltaic cell, more than one fuel cell, more than one wind turbine generator, more than one unidirectional DC-AC converter, more than one bidirectional DC-DC charging-discharging equipment, and more than one unidirectional DC-DC converter; each of the solar photovoltaic cell and fuel cell is connected respectively to the radial low voltage DC bus by a unidirectional DC-DC converter; each of the micro gas turbine and wind turbine generator is connected respectively to the radial low voltage DC bus b by a unidirectional AC-DC converter; each energy storage device is connected to the radial low voltage DC bus through a bidirectional DC-DC converter; an output end of each unidirectional DC-AC converter is connected to an AC load; the other end of each bidirectional DC-DC charging-discharging equipment is connected to the battery of the electric vehicle; and an output end of each unidirectional DC-DC converter is connected to a DC load.

A renewable energy-based hybrid bidirectional interactive DC traction power supply system includes a traction substation for supplying DC energy to an electric locomotive, wherein each traction substation has more than one first transformer connected to a AC bus and more than one second transformer connected to the AC bus; the other end of each first transformer is correspondingly coupled to a rectifier, and the other end of each second transformer is correspondingly coupled to a bidirectional AC-DC converter; the other end of each rectifier and bidirectional AC-DC converter is coupled to a DC bus of a corresponding traction substation; the positive and negative ends of the DC bus are connected to a catenary and steel rail respectively; the positive and negative ends of the electric locomotive are connected to the catenary and steel rail respectively; a DC bus is provided with a DC renewable energy system constructed by an electric vehicle charging-discharging system, a distributed generation and more than one low voltage DC microgrid; the DC renewable energy system is connected to the DC bus of the traction substations through a high voltage DC bus, thus a DC circular microgrid being formed in a power supply section post, and wherein the electric vehicle charging-discharging system is formed by more than one bidirectional DC-DC charging-discharging equipments which are intended for in connection with the power batteries of the electric vehicle.

An output end, for connecting to the power batteries of the electric vehicle, of each DC-DC charging-discharging equipments is connected in parallel to a super capacitor.

The distributed generation includes more than one micro gas turbine, more than one wind turbine generator, more than one fuel cell, and more than one solar photovoltaic cell; each of the micro gas turbine and wind turbine generator is connected respectively to the high voltage DC bus by a unidirectional AC-DC converter; and each of the fuel cell and solar photovoltaic cell is connected respectively to the high voltage DC bus by a unidirectional DC-DC converter.

The low voltage DC microgrid comprise a circular low voltage DC bus a connected to the high voltage DC bus via a bidirectional DC-DC converter, more than one energy storage device, more than one micro gas turbine, more than one solar photovoltaic cell, more than one fuel cell, more than one wind turbine generator, more than one unidirectional DC-AC converter, more than one bidirectional DC-DC charging-discharging equipment, and more than one unidirectional DC-DC converter; each of the solar photovoltaic cell and fuel cell is connected respectively to the circular low voltage DC bus a by a unidirectional DC-DC converter; each of the micro gas turbine and wind turbine generator is connected respectively to the circular low voltage DC bus a by a unidirectional AC-DC converter; each energy storage device is connected to the circular low voltage DC bus a through a bidirectional DC-DC converter; an output end of each unidirectional DC-AC converter is connected to an AC load; the other end of each bidirectional DC-DC charging-discharging equipment is connected to the battery of the electric vehicle; and an output end of each unidirectional DC-DC converter is connected to a DC load.

The low voltage DC microgrid comprises a radial low voltage DC bus b connected to the high voltage DC bus via a bidirectional DC-DC converter, more than one energy storage device, more than one micro gas turbine, more than one solar photovoltaic cell, more than one fuel cell, more than one wind turbine generator, more than one unidirectional DC-AC converter, more than one bidirectional DC-DC charging-discharging equipment, and more than one unidirectional DC-DC converter; each of the solar photovoltaic cell and fuel cell is connected respectively to the radial low voltage DC bus b by a unidirectional DC-DC converter; each of the micro gas turbine and wind turbine generator is connected respectively to the radial low voltage DC bus b by a unidirectional AC-DC converter; each energy storage device is connected to the radial low voltage DC bus b through a bidirectional DC-DC converter; an output end of each unidirectional DC-AC converter is connected to an AC load; the other end of each bidirectional DC-DC charging-discharging equipment is connected to the battery of the electric vehicle; and an output end of each unidirectional DC-DC converter is connected to a DC load.

The renewable energy-based hybrid bi-directionally interactive DC traction power supply system of the invention is based on a DC microgrid formed by a distributed generation, an electric vehicle charging-discharging system mainly featured in battery swapping and a bidirectional AC-DC grid connected converter. The present invention realizes effective usage of distributed generation and recycling of electric locomotive braking energy, reducing DC voltage fluctuation, improving power factor at AC end of the main substation through PWM, and reducing harmonic waves. If the distributed generation and electric vehicle charging-discharging system mainly featured in battery swapping have sufficient capacity, the system may run in islanding manner, thus improving reliability of the DC traction power supply system. Construction cost of the electric vehicle charging system is also decreased due to sufficient usage of DC traction power supply system in charging the electric vehicle. Mutual interactivity of electric power is achieved by bidirectional AC-DC grid connected converter which has the function of "peak cutting and valley compensating", thus improving economy of the entire system.

In these figures, each numeral has its meaning as listed below:

1: traction substation
2: electric locomotive
3: DC renewable energy system
4: high voltage DC bus
5: AC bus
11: first transformer
12: rectifier
13: DC bus
14: catenary
15: steel rail
16: section post
17: second transformer
18: bidirectional AC-DC converter
31: low voltage DC microgrid
32: bidirectional DC-DC charging-discharging machine
33: micro gas turbine
34: unidirectional AC-DC converter
35: wind turbine generator
36: unidirectional AC-DC converter
37: fuel cell
38: unidirectional DC-DC converter
39: solar photovoltaic cell
40: unidirectional DC-DC converter

DETAILED DESCRIPTION OF PARTICULAR EMBODIMENTS OF THE INVENTION

Detailed description of a renewable energy-based hybrid bi-directionally interactive DC traction power supply system of the invention will be made with reference to embodiments and drawings.

According to the current invention, there is provided a renewable energy-based hybrid bi-directionally interactive DC traction power supply system. It is a DC microgrid produced which incorporates distributed generation, charging and discharging system of electric vehicle mainly employing battery-swapping, and DC traction power supply system. The present invention proposes a bidirectional interactive DC traction power supply system.

The present invention provides a renewable energy-based hybrid bi-directionally interactive DC traction power supply system powered bilaterally, i.e., a bidirectional interactive DC traction power supply system based on paralleled and combined rectifier and bidirectional AC-DC converter. As denoted in FIG. 2, a renewable energy-based hybrid bi-directionally interactive DC traction power supply system according to the current invention includes at least two traction substations 1 for supplying DC energy to an electric locomotive 2. Each traction substation 1 has more than one first transformers 11 connected to a AC bus 5 and more than one second transformers 17 connected to the AC bus 5. The other end of each first transformer 11 is correspondingly coupled to a rectifier 12, and the other end of each second transformer 17 is correspondingly coupled to a bidirectional AC-DC converter 18. The other end of each rectifier 12 and bidirectional AC-DC converter 18 is coupled to a DC bus 13 of a corresponding traction substation 1. The negative and positive ends of the DC bus 13 are connected to a catenary 14 and steel rail 15 respectively. The negative and positive ends of the electric locomotive 2 are connected to the catenary 14 and steel rail 15 respectively. The catenary 14 of each traction substation 1 is coupled with a section post 16. The both ends of the section post 16 are respectively connected to positive end of a corresponding DC bus 13.

Figure 2:
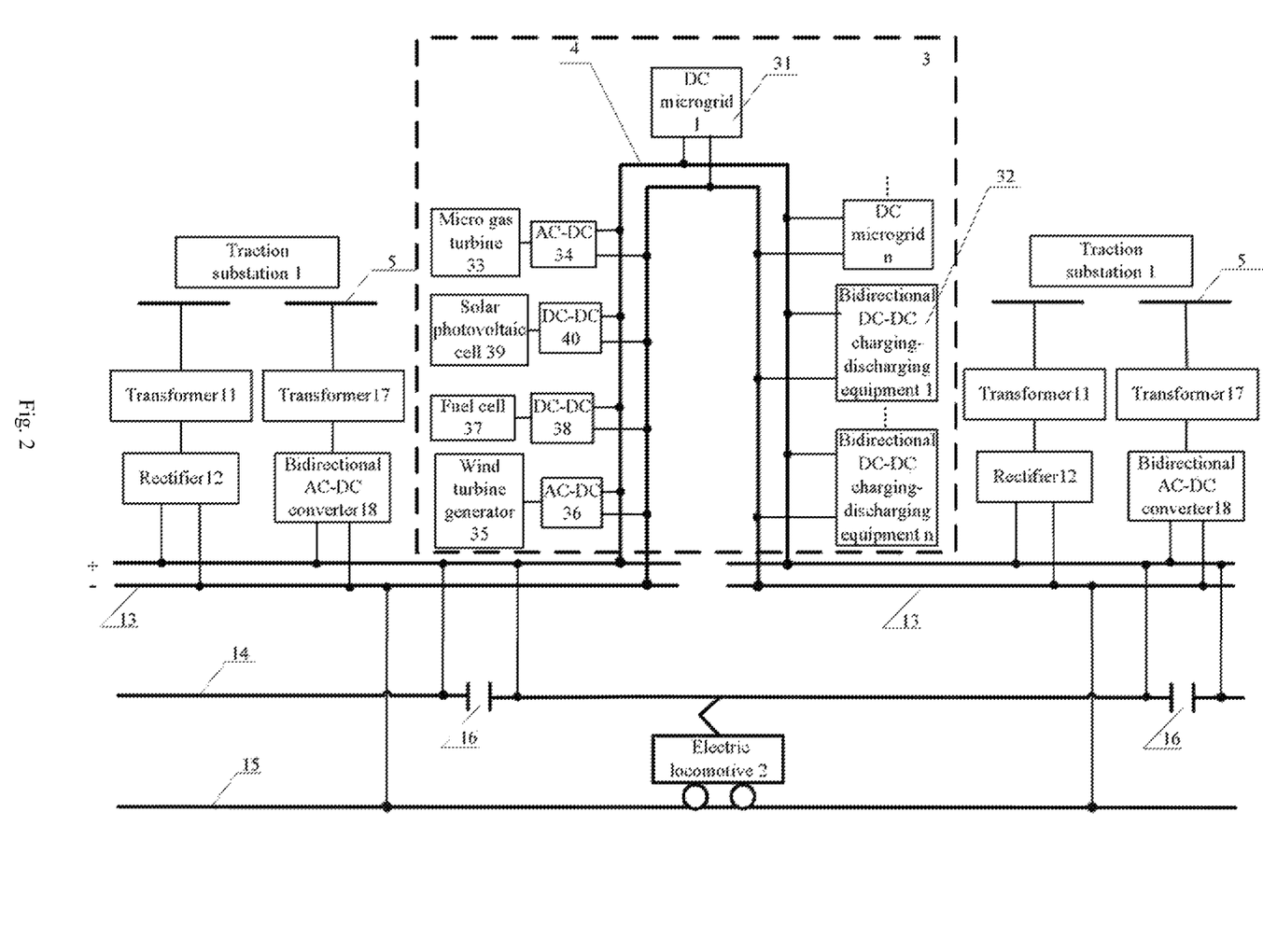
FIG. 2 illustrates a schematic view of a renewable energy-based hybrid bi-directionally interactive DC traction power supply system which is two-way supplying.

Wherein, the transformer may be a two-winding transformer, three-winding transformer, or another kind of three-winding transformer of which the primary winding is connected in a prolonged delta manner and phase shift is ±7.5°. The rectifier may be an uncontrolled rectifier made of diode, or a PWM controlled rectifier. The diode rectifier may be of a six-pulse, twelve-pulse or twenty four-pulse rectifier. The bidirectional AC-DC converter may be a voltage source converter, or a current source converter and it may be pulse width modulated. Although FIG. 2 shows that each traction substation includes two transformers, a rectifier and a bidirectional AC-DC converter, it just an exemplary embodiment, the specific traction substation are not limited as such.

A DC bus 13 between two adjacent traction substations 1 is provided with a DC renewable energy system 3 constructed by an electric vehicle charging-discharging system, a distributed generation and more than one low voltage DC microgrid 31. The DC renewable energy system 3 is connected to the DC bus 13 between two adjacent traction substations 1 through a high voltage DC bus 4. By this manner, a DC circular microgrid is formed in a power supply section post. The electric vehicle charging-discharging system is formed by more than one bidirectional DC-DC charging-discharging equipments 32 which are intended for in connection with the power batteries of the electric vehicle. To improve dynamic performance of the system, an output end, for connecting to the power batteries of the electric vehicle, of each DC-DC charging-discharging equipments 32 is connected in parallel to a super capacitor (not shown in figures).

The distributed generation includes more than one micro gas turbine 33, more than one wind turbine generator 35, more than one fuel cell 37, and more than one solar photovoltaic cell 39. In this embodiment, each of the micro gas turbine 33 and wind turbine generator 35 is connected respectively to the high voltage DC bus 4 via a unidirectional AC-DC converter 34/36. Each of the fuel cell 37 and solar photovoltaic cell 39 is connected respectively to the high voltage DC bus 4 by a unidirectional DC-DC converter 38/40.

Figure 4:
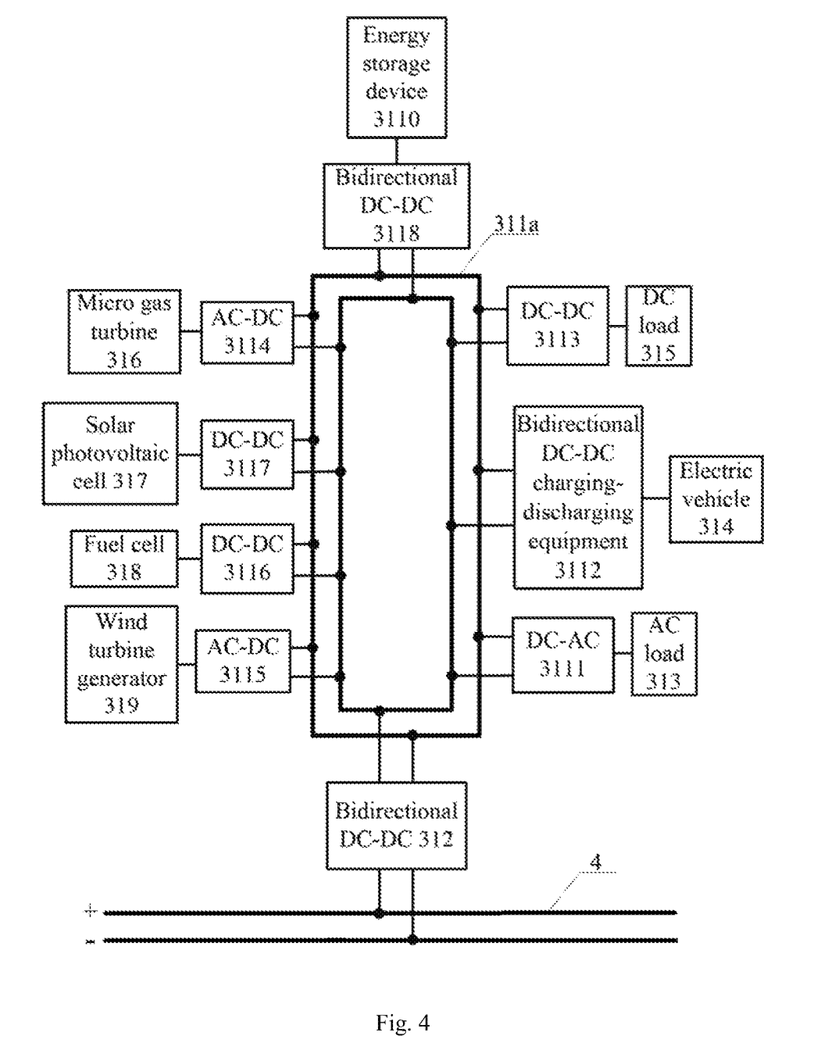
FIG. 4 illustrates a schematic view of circular low voltage DC microgrid.
Figure 5:
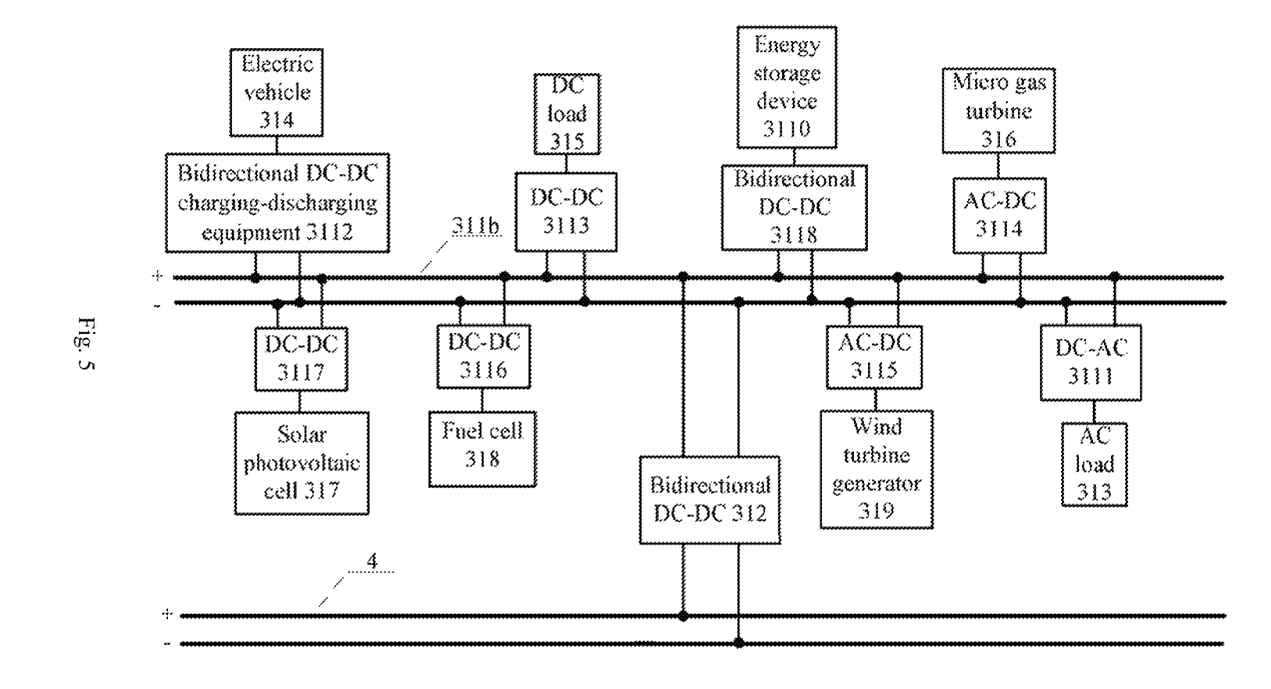
FIG. 5 illustrates a schematic view of a radial low voltage DC microgrid.

Upon different situations, the solar photovoltaic cell 39 and wind turbine generator 35 may be controlled with maximum power point tracking control or be controlled with maximum current. The unidirectional AC-DC converter 34/36 and unidirectional DC-DC converter 38/40 may be controlled by the scheme of master-slave control, peer to peer control, droop control, or hierarchical control. Due to limitation of figures, only one scheme is shown as typical for four kinds of distributed generation. In fact, the type and number of the distributed generation are not limited in embodiment described above. The low voltage DC microgrid 31 is connected the DC bus of the catenary via the bidirectional DC-DC converter and high voltage DC bus 4, and it may run under either grid connected status or stand-alone (islanding) status, the structure may be circular structure (as shown in FIG. 4), radial structure (as shown in FIG. 5) or other type. The rectifiers and bidirectional AC-DC converter are directly connected to the DC bus 13. The distributed generation, electric vehicle charging-discharging system and low voltage DC microgrid are connected to the DC bus of the two traction substations through the high voltage DC bus 4, thus forming a DC circular microgrid in a power supply section post.

Figure 3:
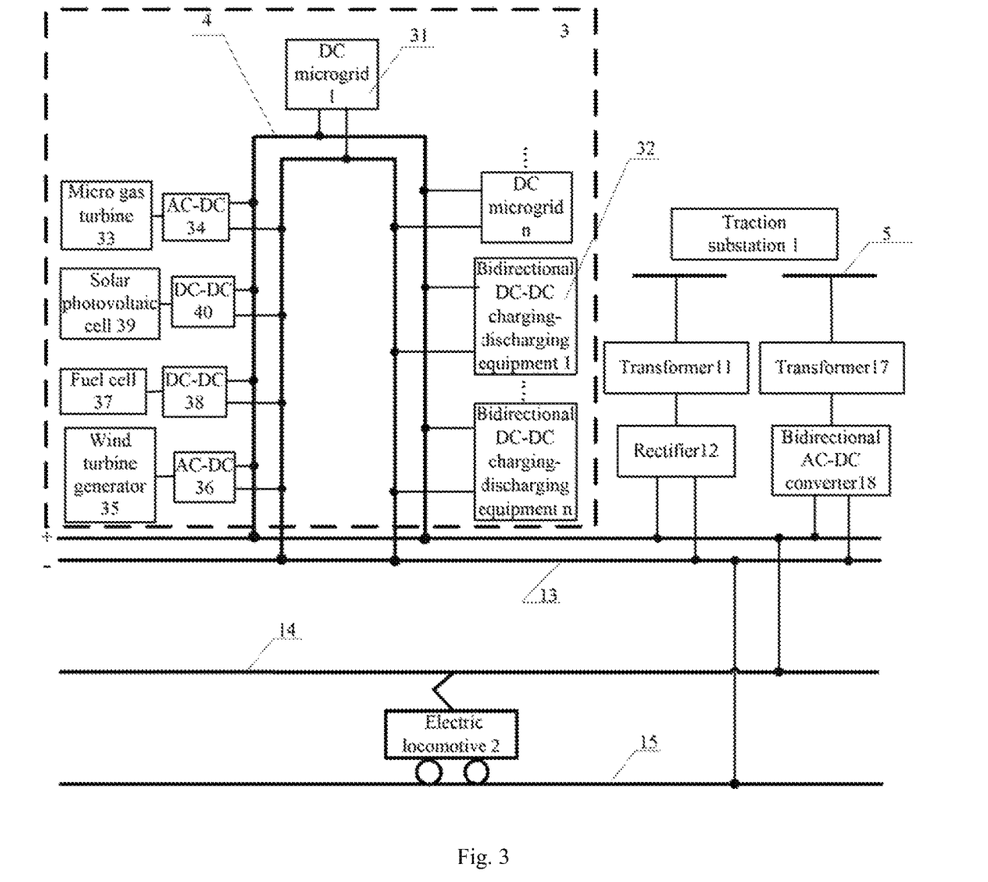
FIG. 3 illustrates a schematic view of a renewable energy-based hybrid bi-directionally interactive DC traction power supply system which is one-way supplying.

The present invention also provides a bidirectional interactive DC traction power supply system based on paralleled and combined rectifier and bidirectional AC-DC converter and unilaterally powered. As denoted in FIG. 3, a renewable energy-based hybrid bi-directionally interactive DC traction power supply system according to the current invention includes a traction substation 1 for supplying DC energy to an electric locomotive 2. Each traction substation 1 has more than one first transformers 11 connected to a AC bus 5 and more than one second transformers 17 connected to the AC bus 5. The other end of each first transformer 11 is correspondingly coupled to a rectifier 12, and the other end of each second transformer 17 is correspondingly coupled to a bidirectional AC-DC converter 18. The other end of each rectifier 12 and bidirectional AC-DC converter 18 is coupled to a DC bus 13 of a corresponding traction substation 1. The negative and positive ends of the DC bus 13 are connected to a catenary 14 and steel rail 15 respectively. The positive and negative ends of the electric locomotive 2 are connected to the catenary 14 and steel rail 15 respectively. The electric locomotive serves as load of the traction substation. Wherein, the transformer may be a two-winding transformer, three-winding transformer, or another kind of three-winding transformer of which the primary winding is connected in a prolonged delta manner and phase shift is ±7.5°. The rectifier may be an uncontrolled rectifier made of diode, or a PWM controlled rectifier. The diode rectifier may be of a six-pulse, twelve-pulse or twenty four-pulse rectifier. The bidirectional AC-DC converter may be a voltage source converter, or a current source converter and it may be pulse width modulated. Although FIG. 3 shows that each traction substation includes two transformers, a rectifier and a bidirectional AC-DC converter, it just an exemplary embodiment, the specific traction substation is not limited as such.

A DC bus 13 is provided with a DC renewable energy system 3 constructed by an electric vehicle charging-discharging system, a distributed generation and more than one low voltage DC microgrid 31. The DC renewable energy system 3 is connected to the DC bus 13 of the traction substation 1 through a high voltage DC bus 4. By this manner, a DC circular microgrid is formed in a power supply section post. The electric vehicle charging-discharging system is formed by more than one bidirectional DC-DC charging-discharging equipments 32 which are intended for in connection with the power batteries of the electric vehicle. An electric vehicle charging-discharging system mainly featured in battery swapping is built by n bidirectional DC-DC (DC-DC is shown in this figure) charging-discharging equipments. To improve dynamic performance of the system, an output end, for connecting to the power batteries of the electric vehicle, of each DC-DC charging-discharging equipment 32 is connected in parallel to a super capacitor (not shown in figures).

The distributed generation includes more than one micro gas turbine 33, more than one wind turbine generator 35, more than one fuel cell 37, and more than one solar photovoltaic cell 39. Wherein, each of the micro gas turbine 33 and wind turbine generator 35 is connected respectively to the high voltage DC bus 4 by a unidirectional AC-DC converter 34/36. Each of the fuel cell 37 and solar photovoltaic cell 39 is connected respectively to the high voltage DC bus 4 by a unidirectional DC-DC converter 38/40.

Upon different situation, the solar photovoltaic cell 39 and wind turbine generator 35 may be controlled with maximum power point tracking control or be controlled with maximum current. The unidirectional AC-DC converter 34/36 and unidirectional DC-DC converter 38/40 may be controlled by the scheme of master-slave control, peer to peer control, droop control, or hierarchical control. Due to limitation of figures, only one scheme is shown as typical for four kinds of distributed generation. In fact, the type and number of the distributed generation are not limited in embodiment described above. The low voltage DC microgrid 31 is connected to the DC bus of the catenary via the bidirectional DC-DC converter and high voltage DC bus 4, and it may run under either grid connected status or stand-alone (islanding) status. It may have the structure of circular structure (as shown in FIG. 4), radial structure (as shown in FIG. 5) or other type. The rectifiers and bidirectional AC-DC converter are directly connected to the DC bus 13. The distributed generation, electric vehicle charging-discharging system and low voltage DC microgrid are connected to the DC bus of the two traction substations through the high voltage DC bus 4, thus forming a DC circular microgrid in a power supply section post.

As shown in FIG. 4, the low voltage DC microgrid 31 as shown in FIGS. 2-3 includes a circular low voltage DC bus 311*a* connected to the high voltage DC bus 4 via a bidirectional DC-DC converter 312, more than one energy storage device 3110, more than one micro gas turbine 316, more than one solar photovoltaic cell 317, more than one fuel cell 318, more than one wind turbine generator 319, more than one unidirectional DC-AC converter 3111, more than one bidirectional DC-DC charging-discharging equipment 3112, and more than one unidirectional DC-DC converter 3113. Each of the solar photovoltaic cell 317 and fuel cell 318 is connected respectively to the circular low voltage DC bus 311*a* by a unidirectional DC-DC converter 3117/3116. Each of the micro gas turbine 316 and wind turbine generator 319 is connected respectively to the circular low voltage DC bus 311*a* by a unidirectional AC-DC converter 3114/3115. Each energy storage device 3110 is connected to the circular low voltage DC bus 311*a* through a bidirectional DC-DC converter 3118. An output end of each unidirectional DC-AC converter 3111 is connected to an AC load 313. The other end of each bidirectional DC-DC charging-discharging equipment 3112 is connected to the battery of the electric vehicle 314. An output end of each unidirectional DC-DC converter 3113 is connected to a DC load 315. The energy storage device 3110 is coupled with the DC bus 13 connected to the catenary through in sequence the circular low voltage DC bus 311*a*, bidirectional DC-DC converter 312 and DC bus 4.

In current invention, the energy storage device may store energy using battery, super capacitor, or any other storage device. The DC load may be LED lighting equipment or other kinds of consumer electronics or other DC load. The AC load may be for example an air conditioner, washing machine or other AC load. The bidirectional DC-DC charging-discharging equipment of the electric vehicle may charge and discharge for a battery electric vehicles, plug-in hybrid electric vehicle, or battery.

As shown in FIG. 5, the low voltage DC microgrid 31 as shown in FIGS. 2-3 may also includes a radial low voltage DC bus 311*b* connected to the high voltage DC bus 4 via a bidirectional DC-DC converter 312, more than one energy storage device 3110, more than one micro gas turbine 316, more than one solar photovoltaic cell 317, more than one fuel cell 318, more than one wind turbine generator 319, more than one unidirectional DC-AC converter 3111, more than one bidirectional DC-DC charging-discharging equipment 3112, and more than one unidirectional DC-DC converter 3113. Each of the solar photovoltaic cell 317 and fuel cell 318 is connected respectively to the radial low voltage DC bus 311*b* by a unidirectional DC-DC converter 3117/3116. Each of the micro gas turbine 316 and wind turbine generator 319 is connected respectively to the radial low voltage DC bus 311*b* by a unidirectional AC-DC converter 3114/3115. Each energy storage device 3110 is connected to the radial low voltage DC bus 311*b* through a bidirectional DC-DC converter 3118. An output end of each unidirectional DC-AC converter 3111 is connected to an AC load 313. The other end of each bidirectional DC-DC charging-discharging equipment 3112 is connected to the battery of the electric vehicle 314. An output end of each unidirectional DC-DC converter 3113 is connected to a DC load 315.

The low voltage DC microgrid is coupled with the DC bus connected to the catenary through the bidirectional DC-DC converter and high voltage DC bus 4. The energy storage device may store energy using battery, super capacitor, or any other storage device. The DC load may be LED lighting equipment or other kinds of consumer electronics or other DC load. The AC load may be for example an air conditioner, washing machine or other AC load. The bidirectional DC-DC charging-discharging equipment of the electric vehicle may charge and discharge for a battery electric vehicle, plug-in hybrid electric vehicle, or battery.

FIGS. 4 and 5 are adapted to both of bidirectional interactive DC traction power supply system of unilateral powered as shown in FIG. 3 and bidirectional interactive DC traction power supply system of bilateral powered as shown in FIG. 2.

As shown in FIGS. 2 and 3, the catenary is connected to a DC output positive end of the DC traction substation, supplying power to the electric locomotive through suspended catenary. The rail is connected to a DC output negative end of the DC traction substation for realizing back flow of the steel rail. In addition to catenary power supplying, a third rail may also be employed to feed power. The steel rail may be mounted in a floating manner to reduce current corrosion to underground pipe lines.

The renewable energy-based hybrid bi-directionally interactive DC traction power supply system according to the invention sufficiently utilizes distributed generation and braking energy of the electric locomotive, under coordinated control of the bidirectional AC-DC converter, the converter of distributed generation and an electric vehicle charging-discharging system mainly featured in battery swapping, hence stably maintaining DC bus voltage in desired range. When the DC traction power supply system has surplus electric energy, the DC bus voltage rises to a defined voltage threshold, and the electric vehicle charging-discharging system utilizes surplus electric energy to charge the battery of the electric vehicle through the charging-discharging equipment. The rest surplus electric energy returns back to the AC grid via the bidirectional AC-DC converter (herein it is called as inverter) so as to prevent the DC bus from exceeding defined value. When the DC traction power supply system has insufficient electric energy, the DC bus voltage drops to a defined voltage threshold, and at this time, the bidirectional AC-DC converter (working as rectifier) transforms AC energy into DC energy and supplies power to the DC bus. The battery of the electric vehicle provides power to the DC bus through the charging-discharging equipment so as to prevent the DC bus voltage dropping below the defined value, thus maintaining power balance of the system. By reasonable design and coordinated control, the proposed bidirectional interactive DC traction power supply system realizes not only power supplying to the electric locomotive with high quality and reliability, sufficient recycling of electric locomotive braking energy and suppression of DC bus voltage change, but also effective charging of the battery of the electric vehicle and usage of distributed renewable energy.

If the distributed generation and electric vehicle charging-discharging system mainly featured in battery swapping have sufficient capacity, the DC circular microgrid may run in a grid connected status or stand-alone (islanding) status. When a malfunction is happened in the AC power supply system, it may run in a stand-alone (islanding) status, and the electric locomotive is powered by the distributed generation and electric vehicle charging-discharging system mainly featured in battery swapping, thus enhancing reliability of the DC traction power supply system.

The converters of the system may be controlled by the scheme of master-slave control, peer to peer control, droop control, or hierarchical control. The control command of the system may be generated by a control center through a communication system, or by voltage and current of the system.

The control manner and structure of the various converters of the renewable energy-based hybrid bi-directionally interactive DC traction power supply system of the instant invention may be varied depending upon actual system.

What is claimed is:

1. A DC traction power supply system for supplying DC energy to an electric locomotive, comprising two traction substations (1) and a DC renewable energy system (3); the traction substations and the DC renewable energy system both being parallel connected to a DC bus (13) which has a positive end and a negative end and the DC renewable energy system being located between the two traction substations on the bus; the traction substations each comprising a first transformer (11), connected to an AC bus (5) on one side and to a rectifier (12) on another side, and a second transformer (17), connected to the AC bus on one side and to a bidirectional AC-DC converter (18) on another side; the rectifier and the bidirectional AC-DC converter each having two connection terminals connected the positive end and the negative end of the DC bus, respectively; the DC renewable energy system comprising a plurality of DC microgrids, a plurality of bidirectional DC-DC charging-discharging equipment, and a plurality of electricity generation equipments selected from the group consisting of a plurality of micro gas turbines, a plurality of solar photovoltaic cells, a plurality of fuel cells, and a plurality of wind turbine generators; the microgrids, charging-discharging equipments and electricity generation equipments each being parallel connected to a high voltage DC bus (4) which is further connected to the DC bus.

2. The DC traction power supply system according to claim 1, wherein the DC microgrid comprises a circular low voltage DC bus (311a) connected to the high voltage DC bus (4) via a bidirectional DC-DC converter (312), a plurality of energy storage device (3110), a plurality of micro gas turbine (316), a plurality of solar photovoltaic cell (317), a plurality of fuel cell (318), a plurality of wind turbine generator (319), a plurality of unidirectional DC-AC converter (3111), a plurality of bidirectional DC-DC charging-discharging equipment (3112), and a plurality of unidirectional DC-DC converter (3113); wherein each of the solar photovoltaic cell (317) and fuel cell (318) is connected respectively to the circular low voltage DC bus (311a) by a unidirectional DC-DC converter (3117/3116); each of the micro gas turbine (316) and wind turbine generator (319) is connected respectively to the circular low voltage DC bus (311a) by a unidirectional AC-DC converter (3114/3115); each energy storage device (3110) is connected to the circular low voltage DC bus (311a) through a bidirectional DC-DC converter (3118); an output end of each unidirectional DC-AC converter (3111) is connected to an AC load (313); the other end of each bidirectional DC-DC charging-discharging equipment (3112) is connected to the battery of the electric vehicle (314); and an output end of each unidirectional DC-DC converter (3113) is connected to a DC load (315).

3. The DC traction power supply system according to claim 2, wherein each traction substation (1) comprises two or more first transformer (11), each connected to the AC bus (5) on one side and to a rectifier (12) on another side which is further connected to the DC bus, and two or more second transformer (17), each connected to the AC bus on one side and to a bidirectional AC-DC converter on another side which is further connected to the DC bus.

4. The DC traction power supply system according to claim 1, wherein the DC microgrid comprises a radial low voltage DC bus (311b) connected to the high voltage DC bus (4) via a bidirectional DC-DC converter (312), a plurality of energy storage device (3110), a plurality of micro gas turbine (316), a plurality of solar photovoltaic cell (317), a plurality of fuel cell (318), a plurality of wind turbine generator (319), a plurality of unidirectional DC-AC converter (3111), a plurality of bidirectional DC-DC charging-discharging equipment (3112), and a plurality of unidirectional DC-DC converter (3113); each of the solar photovoltaic cell (317) and fuel cell (318) is connected respectively to the radial low voltage DC bus (311b) by a unidirectional DC-DC converter (3117/3116); each of the micro gas turbine (316) and wind turbine generator (319) is connected respectively to the radial low voltage DC bus 311b by a unidirectional AC-DC converter (3114/3115); each energy storage device (3110) is connected to the radial low voltage DC bus (311b) through a bidirectional DC-DC converter (3118); an output end of each unidirectional DC-AC converter (3111) is connected to an AC load (313); the other end of each bidirectional DC-DC charging-discharging equipment (3112) is connected to the battery of the electric vehicle (314); and an output end of each unidirectional DC-DC converter (3113) is connected to a DC load (315).

5. The DC traction power supply system according to claim 4, wherein each traction substation (1) comprises two or more first transformer (11), each connected to the AC bus (5) on one side and to a rectifier (12) on another side which is further connected to the DC bus, and two or more second transformer (17), each connected to the AC bus on one side and to a bidirectional AC-DC converter on another side which is further connected to the DC bus.

6. A DC traction power supply system according to claim 1, wherein each traction substation (1) comprises two or more first transformer (11), each connected to the AC bus (5) on one side and to a rectifier (12) on another side which is further connected to the DC bus, and two or more second transformer (17), each connected to the AC bus on one side and to a bidirectional AC-DC converter on another side which is further connected to the DC bus second transformer (17).

* * * * *

UNITED STATES PATENT AND TRADEMARK OFFICE
CERTIFICATE OF CORRECTION

PATENT NO. : 10,308,140 B2  
APPLICATION NO. : 14/907808  
DATED : June 4, 2019  
INVENTOR(S) : Meng et al.

Page 1 of 1

It is certified that error appears in the above-identified patent and that said Letters Patent is hereby corrected as shown below:

On the Title Page

Item (71) should appear as follows:
Applicants: NORTH CHINA ELECTRIC POWER UNIVERSITY (BAODING), Boading (CN); STATE GRID CORPORATION OF CHINA, Beijing (CN); STATE GRID LIAONING ELECTRIC POWER COMPANY LIMITED ECONOMIC RESEARCH INSTITUTE, Shenyang (CN)

Item (73) should appear as follows:
Assignees: North China Electric Power University (Baoding), Boading (CN); State Grid Corporation Of China, Beijing (CN); State Grid Liaoning Electric Power Company Limited Economic Research Institute, Shenyang (CN)

Signed and Sealed this
Twenty-ninth Day of October, 2019

Andrei Iancu
*Director of the United States Patent and Trademark Office*